INVENTORS
CHARLES F. CAMPEN JR. &
VINCENT E. LALLY.
BY
Wade Koontz and
Martin J. Finnegan
ATTORNEYS INVENTORS
CHARLES F. CAMPEN JR. &
VINCENT E. LALLY
BY
Wade Koontz and
Martin J. Finnegan
ATTORNEYS INVENTORS
CHARLES F. CAMPEN JR.,
& VINCENT E. LALLY.
BY Wade Koontz and Martin J. Finnegan
ATTORNEYS United States Patent Office
2,923,770
Patented Feb. 2, 1960

2,923,770

METHOD AND MEANS FOR ELECTRONIC TRANSMISSION AND REPRODUCTION OF DATA IN GRAPHIC FORM

Vincent E. Lally, Needham, and Charles F. Campen, Jr., Wayland, Mass., assignors to the United States of America as represented by the Secretary of the Air Force Application October 22, 1956, Serial No. 617,660

10 Claims. (Cl. 178—19)

(Granted under Title 35, U.S. Code (1952), sec. 266)

The invention described herein may be manufactured and used by or for the United States Government for governmental purposes without payment to us of any royalty thereon.

This invention relates to an electrographic transmission system and more particularly to a monitored color system.

The present invention may be specifically applied to a "Weatherplotter" system wherein weather maps and charts are transmitted from a weather central and then received by a large number of weather stations. It may also be applied for remote reproduction of any kind of data capable of graphic display.

In the prior art there are two basic methods for the transmission of weather data—teletype and facsimile. Teletype is generally utilized to transmit observational data and occasional "canned" analyses. The analyzed data and prognostic charts are transmitted over a facsimile network.

Commonly used teletype systems provide weather data according to schedule rather than demand. Because of the enormous labor problem involved in converting map details to printable characters, the forecaster of necessity must resort to drastic abridgments or condensations of the available data. Furthermore, the periodic observations are often relatively obsolete by the time they are available to the forecaster.

The facsimile method of transmission of weather maps and charts consists primarily of the transmission of a series of lines plus various standard notations. The information content is usually not detailed since time limitations in both drawing and reading the map preclude a complicated construction. Considered abstractly facsimile is capable of reproducing any type of graphic representation within the limits of definition provided by the number of lines per inch. However, the actual application of facsimile to reproducing a weather map involves primarily "filling in" the white background, and requires an inordinate amount of bandwidth to transmit a map which consists of a series of lines. Facsimile has the following limitations for transmission of weather maps: it is too slow; charts are ordinarily too small; definition is poor on detail; geographic detail must be reduced or eliminated to prevent confusion with the isolines of weather information; it is difficult to write additional information on the facsimile paper; and there is no color contrast or other means of discrimination on a facsimile map. Quite often a facsimile map will be so unclear as to approach illegibility; the lack of color contrast and cramped size make the map difficult to interpret.

In accordance with the present invention, a weather map or other graph is traced by viewing the signal output of a system and concurrently manipulating a control device, apart from the map itself, to the proper extent, and in the proper direction, to cause the application to the map of selected indices representative of weather information; the said manipulation of the control device being further effective for concurrently transmitting said signal output to remote stations.

An object of this invention, therefore, is to provide novel methods and systems for the transmission of weather maps and charts from a weather central to a large number of remote weather stations.

A further object is to provide methods and systems whereby weather maps and charts may be transmitted more rapidly than in existing systems.

Another object of this invention is to provide methods and systems of the kind described, wherein it is possible to reduce the bandwidth presently required for the transmission of weather maps and charts.

A further object of this invention is to provide methods and systems for the transmission and reception of weather maps and charts in a manner providing for gradations of emphasis as between successively presented bits of informational data; the emphasis differentiations (in the form of contrasting colors or other distinguishing aspects) being applied by means of selectively and alternately operable contrast-applying signaling circuits, under the control of the operator at the central transmitting station.

Another object is to provide methods and systems for the transmission and reception of weather maps and charts wherein system errors may be corrected at the transmitting central.

The novel features that we consider characteristic of our invention are set forth with particularity in the appended claims. The invention itself, however, both as to its organization and its method of operation, together with additional objects and advantages thereof, will be understood from the following description of one specific embodiment thereof when read in connection with the accompanying drawings, in which:

Figure 1:
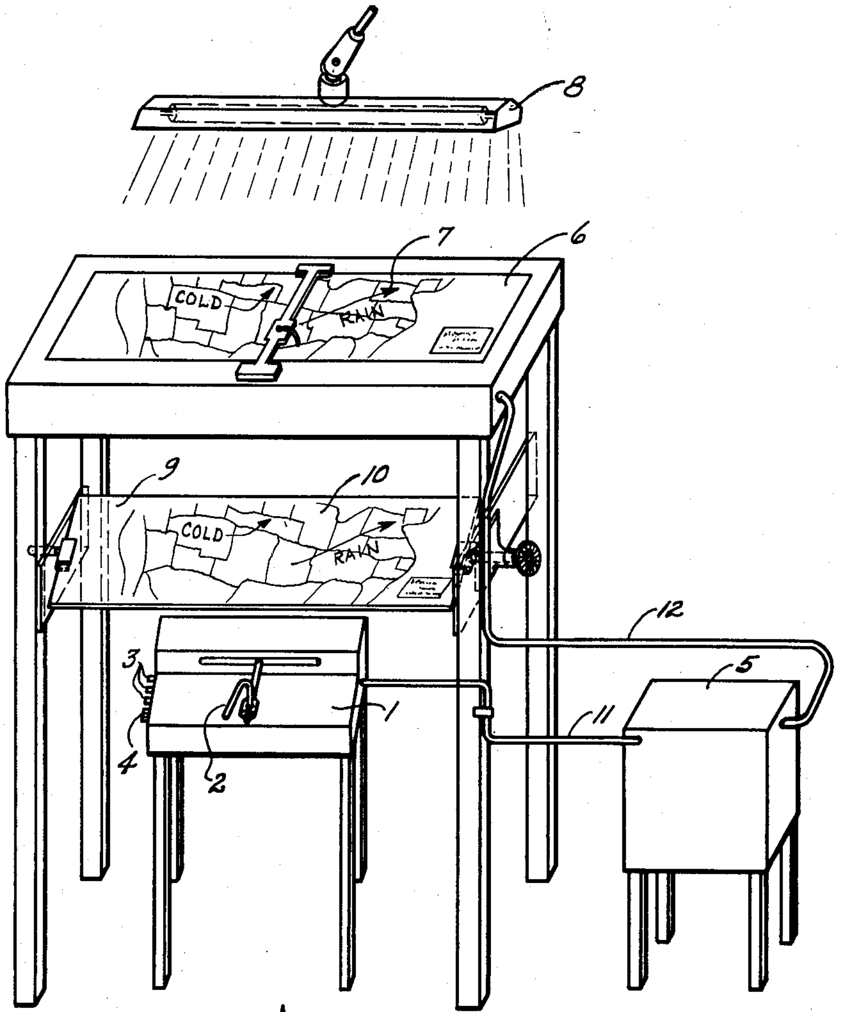
Figs. 1 and 2 are, respectively, plan and profile views of apparatus embodying the invention.
Figure 4:
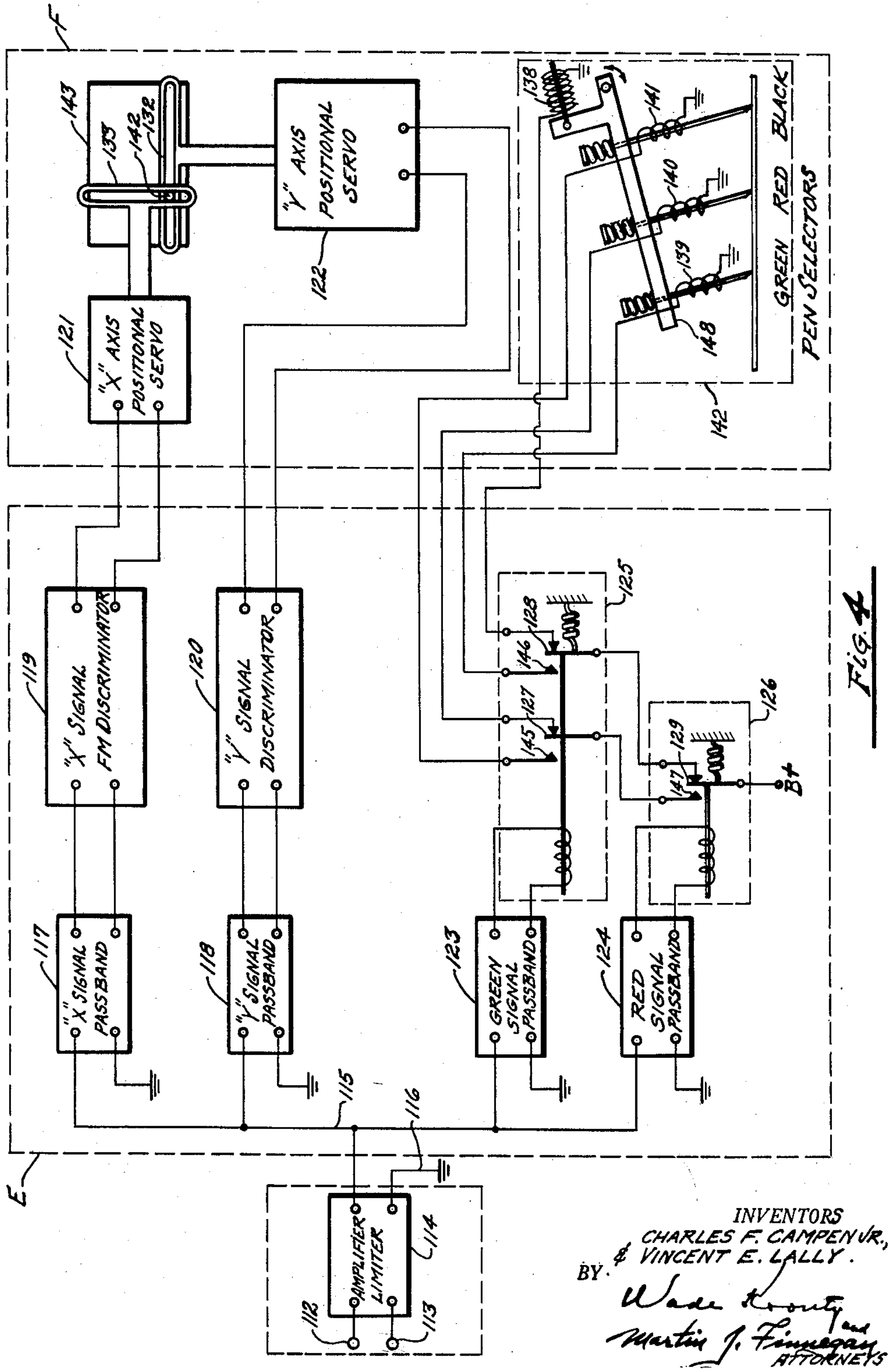
Fig. 4 shows a similar diagram of the 'Weatherplotter" decoder and plotting table portions of the apparatus, the latter being duplicated at each of the remote receiving stations.

Referring now to Fig. 1, there is shown a transmitting central for the 'Weatherplotter" system. Map 7, inscribed with pencilled data representative of the weather information to be transmitted, is placed on top of plotting table 6. Optical viewer 9, a mirror, permits the operator of tracing generator 1 to view the map through the transparent base of plotting table 6. The necessary illumination is provided by light source 8. The operator observes on the optical viewer 9 the position of the pencilled data on the completed weather map 7. This data may be in the form of lines whose directions and inter-relationships will indicate component factors of a weather pattern. To transmit the selected indicia representative of weather information, the operator traces each line by actuating control device 2 of tracing generator 1, thereby generating electrical voltages for the purpose of converting "X" and "Y" mechanical positions into electrical data; it being understood that the said generator is a conventional voltage generator having co-acting movable and stationary elements whose relative motion will cause generation of electrical current at a varying voltage rate, with the voltage level being determined by the degree of motion of the actuating handle 2. This data is utilized concurrently for transmission to remote stations (one of which is represented in Fig. 4) and to actuate decoder 5. The output of tracing generator 1 is fed to decoder 5 by way of cable 11. Decoder 5 is comprised of suitable filters and discriminators to decode the electrical data of tracing generator 1 and to transmit "X" and "Y" voltages to drive the plotting table servos and to actuate the proper pen on the plotting table so as to apply an inked line upon map 7. The operator, by his constant observations of optical viewer 9, may readily see the actual position of the inked line in relationship to the pencilled line being traced. He then executes a succession of tracing apparatus by manipulating control device 2 to the proper extent, and in the proper direction to cause the application to map 7 of a succession of inked lines which will fall precisely upon the corresponding pencilled lines pre-applied to said map 7. Most errors are automatically compensated between the eye and hand of the operator. Optical viewer 9 permits the retracing of the pre-applied weather inscriptions on map 7 without mechanical obstructions. Tracing speed will be faster, also, since the operator's hand will not act as an additional visual obstruction.

The operator traces map 7 by examining the output of the system. He performs the function of transmitting and monitoring simultaneously. Thus, the operator is, in effect, a part of a servo loop, in that his manipulations of control device 2 serves to compensate for many of the errors which would otherwise exist in the system in the form of non-linearities of the transmitting circuits or gradual drifts in the frequency of the data transmission. Calibration is automatic and no requirement exists for linearity or for stability of the frequency output of tracing generator 1. Great accuracies are possible as long as the decoders and plotting tables of the system are selected so that their perfromance characteristics are essentially identical.

While the operator is tracing and transmitting weather map 7, by manipulating control device 2 with his right hand, he concurrently controls color selector 3 with his left hand. The said color selector is comprised of three push-button self-latching switches (3, 3′, 3″) arranged so that pushing any one button to the "on" position will cause any previously "on" button to disengage and return to the "off" position.

Each one of the three button switches in color selector 3 controls its respective contrast-applying circuit in such a manner that the operator by selectively and alternately actuating the said button switches may apply to weather map 7 and simultaneously to other weather maps being reproduced at remote stations of the network inked lines in either one of three contrasting colors. In this embodiment, the colors are either red, black or green. Each button switch and its respective contrast-applying circuit control the application of one preselected color. Pen lift switch 4 is located on the side of tracing generator 1 in such a fashion that it can be reached by the left hand of the operator regardless of the position of his right hand on control device 2. Pen lift switch 4 is a push button type switch which is normally "off" and which will spring back to the "off" position when finger pressure is removed. The said switch disconnects the contrast-applying circuits. The mechanism operated by switches 3 and 4 is described in detail hereinafter.

Figure 2:
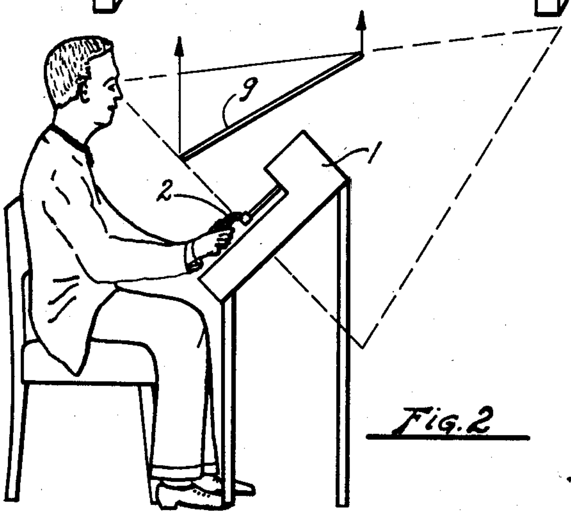

Fig. 2 shows optical viewer 9, a mirror, which permits the operator to obtain a virtual image of weather map 7. By adjustment of the said mirror, the size of the image may be varied. The operator can trace the said map without any mechanical obstructions. Tracing speed will be faster, also, since the operator's hand will not act as an additional obstruction.

Figure 3:
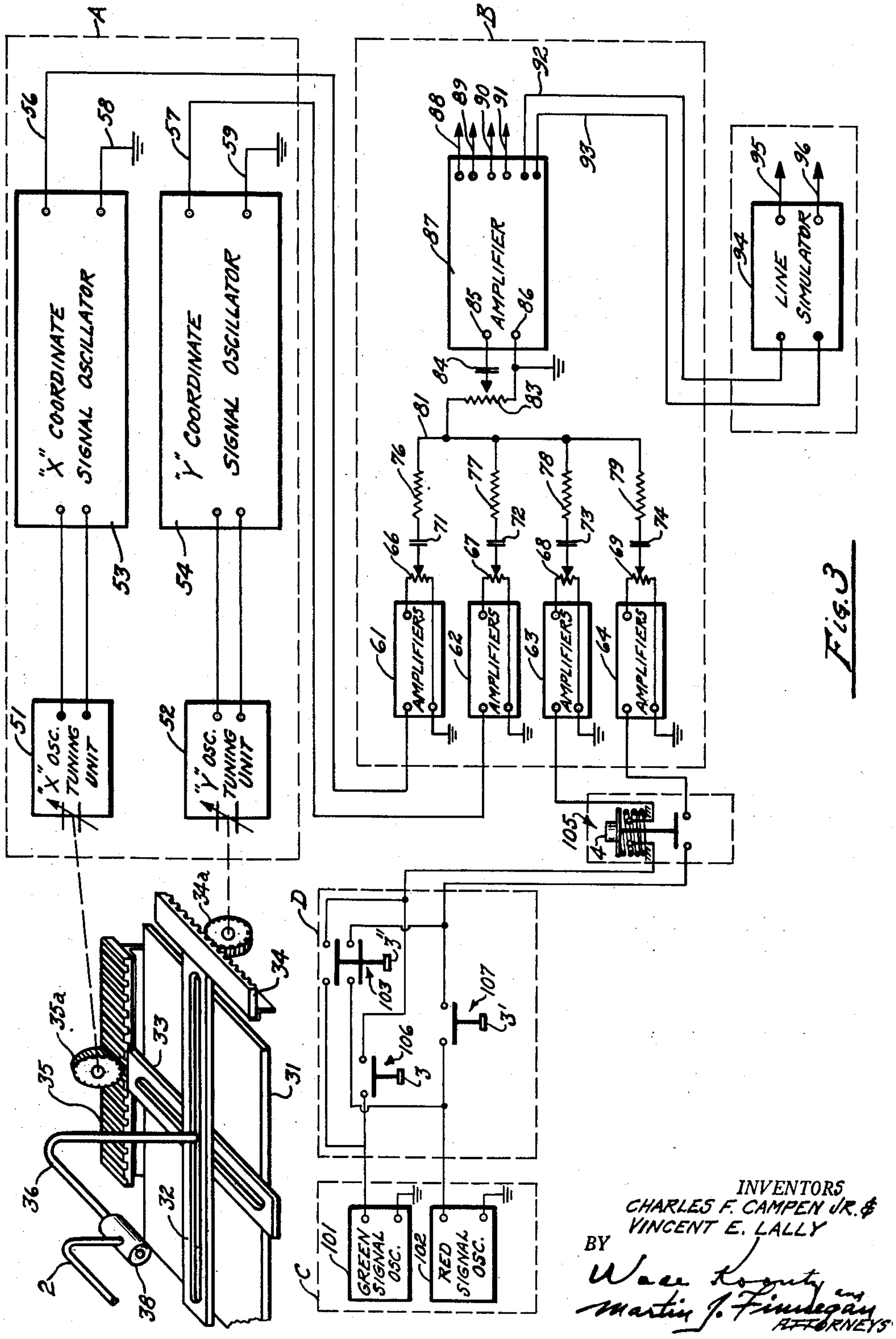
Fig. 3 shows a diagram of mechanical and electronic components of the "Weatherplotter" tracing generator portion of the apparatus.

With reference to the signal tracing generator shown in Fig. 3, the motion imparted to control device 2 by the operator is resolved into its orthogonal, or vectorial, components by a conventional form of mechanical resolution linkage indicated at 31 to 38, inclusive, which linkage includes pinions 34*a* and 35*a* mechanically associated with the movable portions of capacitance plate assemblies constituting parts of oscillator tuning units 51 and 52, respectively. In this fashion, there is set up in oscillators 53 and 54 a pair of signal patterns whose relative frequencies will differ, one from the other, in accordance with the difference in the "X" and "Y" components of the motion resolved in linkage 31–38, which components are reflected in the correspondingly different tuning adjustments imparted to units 51 and 52.

In this embodiment, the tracing generator output is within the frequency limits of 400 to 2400 cycles per second. The "X" and "Y" carriers frequencies are 1700 c.p.s. and 960 c.p.s., respectively. These carriers are modulated ±15%. Since the change in frequency of the "X" and "Y" signals will be relatively slow when varied manually, the bandwidth required for each channel of transmission of the significant frequency spectrum will not greatly exceed the range of the actual modulator deviation.

In order to transmit color information in accordance with one feature of this invention, the tracing generator as shown in Fig. 3 is provided with signal oscillators 101 and 102 as shown at C. During periods of transmission, oscillators 101 and 102 are continuously generating two fixed frequencies differing from each other, for example, 450 c.p.s. and 550 c.p.s., respectively.

The frequencies to be transmitted are chosen by the operator by actuating color selector D which is comprised of three push button switches 103, 106 and 107. The said switches are so arranged mechanically and electrically that pushing down one of said buttons will engage it mechanically in addition thereto the associated switch will make electrical contact, simultaneously the previously "on" button will disengage and disconnect the electrical contact by means of its associated switch. Switches 106 and 107 will connect respectively oscillators 101 and 102. Switch 103 will simultaneously connect oscillators 101 and 102. There is provided by the above combination of oscillators 101, 102 and color selector D means whereby any one of three different frequencies may be selected for transmission. The said frequencies are referred to as color tones. In this embodiment, oscillator 101, 102 generate green and red color tones respectively. When both outputs of oscillators 101 and 102 are used simultaneously a black color tone is generated. Switch 105 normally is in the "off" position, when the operator presses on the said switch the circuit is closed and preselected color tone may then be transmitted.

The FM outputs of oscillators 53, 54 and the color tones of oscillators 101, 102 are fed into isolating amplifiers 61 through 64, respectively. The said frequencies are then fed into a common mixer which is comprised of resistors and capacitors 66 through 84. The output of the said mixer is then fed into amplifier 87. Output terminals 88 and 89 are adapted to feed wire lines. Output terminals 90 and 91 are adapted to feed a radio transmitter to serve as part of a radio link if radio transmission and reception is desired. Lines 92 and 93 conduct the output of amplifier 92 to line simulator 94 which has a frequency response and impedance of a telephone line. This is essentially a bandpass filter whose output is down 6 db at 400 c.p.s., 0 db at 1000 c.p.s., and 4 db at 2600 c.p.s. and whose input and output impedance is 600 ohms. The output of said simulator is taken from terminals 95 and 96 and is fed to local decoder at the transmitting station as shown in Fig. 1.

The receiving apparatus of Fig. 4 is employed at the transmitting "central" and at each of the remote receiving stations. The input to said receiving apparatus may be the output of the tracing generator applied either directly, through wire lines or from radio circuits. This input consists of the "X" and "Y" carriers with their modulation plus C.W. color tones.

The said receiving apparatus is comprised of limiter-amplifier 114, decoder E, and plotting table F. Limiter-amplifier 114 is provided with input terminals 112 and 113. Lines 115 and 116 feed the output of the said amplifier-limiter to four signal pass-band filters 117, 118, 123 and 124 which are connected in parallel. Filters 117 and 118 separate and pass the "X" and "Y" modulated carriers and feed their associated "X" and "Y" frequency discriminators 119 and 120. Pass-band filters 123 and 124 separate and pass only the C.W. green and red color tones, respectively. Associated with filter 123 is multiple pole relay 125, and with filter 124 is multiple pole relay 126. During periods of transmission where color tones are absent, the contacts in relay 125 are at positions 127, 128; for relay 126 the position is at 129.

Plotting table apparatus F is comprised of map holder 143, writing head 142, "X" axis positional servo 121 and "Y" axis positional servo 122.

Writing head 142 is comprised of three pen arms which are selectively lowered to the map surface by appropriate energization of relays 125 and 126, and electromagnets 139, 140, 141. The said pens are mounted on arm 148 serving as a holder and are lifted off the map during the absence of color tones since electromagnet 138 is energized by way of circuit connections 128 and 129 during this period and thereby holds the said arm 148 upward in the pen disengaging position.

When a green color tone is present, multiple pole relay 125 is energized and contact is made at position 145; thereby electromagnet 138 loses its energization and simultaneously, contact is made at positions 145, 146 and electromagnet 139 is energized thereby lowering the associated green pen arm so that its pen touches the surface of the map.

Where a red color tone is present, multiple pole relay 126 is energized. Connection is then made at position 147, thereupon energization is removed from electromagnet 138 and is supplied to 140 instead. The associated red pen arm is then lowered so that its pen touches the surface of the map to be traced. During periods when green and red color tones exist, both multiple pole relays 125 and 126 are energized. Connections are then established at positions 145, 146 and 147. Energization is removed from electromagnet 138 and is provided instead to 141, thereby lowering the associated black pen arm so that its pen touches the map surface. By the use of two color filters 123 and 124 in addition to multiple pole relays 125 and 126, it is possible in this embodiment to obtain three color combinations.

Two frequency discriminators 119 and 120, respectively, demodulate the "X" and "Y" carriers and provide a D.C. output to plotting table servos 121 and 122. "X" axis positional servo 121 thus receives a D.C. voltage which moves writing head 144 along the "X" axis in response to the "X" axis voltage input from decoder E. Similarly, "Y" axis positional servo will move writing head 144 along the "Y" axis in response to the "Y" axis voltage input from decoder E. Thus, in overall operation, a movement of control device 2 at the transmitting "central" results in the generation of frequency modulated tones which are reconverted into D.C. voltages by discriminator circuits 119 and 120 of decoder E in order to operate servo amplifiers 121 and 122 of plotting table F in such a manner as to cause a preselected color pen to follow the position of said control device 2.

What is claimed is:

1. In a system for transmitting weather information from an analysis center to one or more weather stations, means to produce an image of a geographical map with meteorological data inscribed thereon to be displayed at a position displaced from said map, manually operated means for producing mechanical motions whose direction and extent correspond to the meteorological inscriptions on said image, means for converting said motions into electrical signals, means for utilizing said electrical signals to produce visible traces in superimposed relationship to said meteorological inscriptions, means for simultaneously transmitting said electrical signals to remote receiving stations, and means at said receiving stations for converting said electrical signals into duplicate mechanical motions for transcriptions of said meteorological data on duplicates of said geographical map to produce duplicate traces thereon.

2. A system as defined in claim 1 wherein said means to produce an image of said geographical map includes a mirror adapted to reflect the projection of said map.

3. In the system as defined in claim 1 including means for applying a plurality of colors to said traces, and electrical control means for selectively operating said color-applying means.

4. In a system for transmitting meteorological data to one or more remote receiving stations for reproduction thereat, means for causing a geographical map with meteorological data, inscribed thereon to be displayed at a position displaced from said map, manually operated means for creating mechanical motions whose direction and extent correspond to the meteorological inscriptions on said displaced map, means for resolving the said motions into coordinate positions, means for generating electrical signals representative of said coordinate positions, means for utilizing said electrical signals to produce visible traces in superimposed relationship to said meteorological inscriptions, and means for simultaneously transmitting said electrical signals to remote receiving stations for conversion into duplicate coordinate mechanical motions for transcriptions of said meteorological data on duplicates of said geographical map.

5. In a system for transmitting meteorological data to one or more remote receiving stations for reproduction thereat, means for causing a geographical map with meteorological data inscribed thereon to be displayed at a position displaced from said map, manually operated means for producing mechanical motions whose direction and extent correspond to the meteorological inscriptions on said displaced map, means for converting said motions into electrical signals, means for utilizing said electrical signals to produce traces in superimposed relationship to said meteorological inscriptions, means including additional maps and map-making means at each of said remote receiving stations for effecting such reproduction, said map-making means including a plurality of mutually distinguishing map-making elements, and means operable concurrently with said display-producing means for selectively operating said map-marking elements.

6. A system as defined in claim 5 wherein said map-making elements include a series of ink-applying elements, each carrying an ink of distinctive coloring, and means for selectively shifting each of said elements between a withdrawn position and an operation position.

7. In a system for transmitting meteorological data to one or more remote receiving stations for reproduction thereat, means for causing a geographical map with meteorological data inscribed thereon to be displayed at a position displaced from said map, manually operated means for creating mechanical motions whose direction and extent correspond to the meteorological inscriptions on said map, means for resolving the said displaced motions into coordinate positions, means for generating electrical signals representative of said coordinate positions, means for utilizing said electrical signals to produce visible traces in superimposed relationship to said meteorological inscriptions, means for simultaneously transmitting said electrical signals to remote receiving stations for conversion into duplicate coordinate mechanical motions for transcriptions of said meteorological data on duplicates of said geographical map to produce duplicate traces thereon, and means for selectively displaying said duplicate traces in one of several preselected colors.

8. In a system for transmitting meteorological data to one or more remote receiving stations for reproduction thereat, means for causing a geographical map with meteorological data inscribed thereon to be displayed at a position displaced from said map, manually operated means for creating mechanical motions whose direction and extent correspond to the meteorological inscriptions on said displaced map, means for resolving the said motions into coordinate positions, means for generating electrical signals representative of said coordinate positions, means for utilizing said electrical signals to produce visible traces in superimposed relationship to said meteorological inscriptions, means for simultaneously transmitting said electrical signals to remote receiving stations for conversion into duplicate coordinate mechanical motions for transcriptions of said meteorological data on duplicates of said geographical map to produce duplicate traces thereon, and means for displaying said duplicate traces in a plurality of selectable contrasting characterizations constituting a mapping code.

9. In a system for transmitting weather information from an analysis center to one or more weather stations, means to produce an image of a geographical map with meteorological data inscribed thereon to be displayed at a position displaced from said map, manually operated means for producing mechanical motions whose direction and extent correspond to the meteorological inscriptions on said image, means for converting said motions into electrical signals, and means for utilizing said electrical signals to produce visible traces in superimposed relationship to said meteorological inscriptions.

10. In a system as defined in claim 9 including means for applying a plurality of colors to said traces and electrical control means for selectively operating said color-applying means.

References Cited in the file of this patent

UNITED STATES PATENTS

| | | |
|---|---|---|
| 1,040,110 | Anderson | Oct. 1, 1912 |
| 1,681,833 | Allen | Aug. 21, 1928 |
| 1,839,777 | Silberstein | Jan. 5, 1932 |
| 2,186,252 | Little | Jan. 9, 1940 |
| 2,325,451 | Wait | July 27, 1943 |
| 2,583,535 | Adler | Jan. 29, 1952 |